(12) United States Patent
Kawabe et al.

(10) Patent No.: US 10,603,909 B2
(45) Date of Patent: Mar. 31, 2020

(54) INK JET RECORDING METHOD AND INK JET RECORDING APPARATUS

(71) Applicant: CANON KABUSHIKI KAISHA, Tokyo (JP)

(72) Inventors: Minako Kawabe, Koganei (JP); Kouhei Nakagawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/033,407

(22) Filed: Jul. 12, 2018

(65) Prior Publication Data

US 2019/0016130 A1  Jan. 17, 2019

(30) Foreign Application Priority Data

Jul. 14, 2017 (JP) .................. 2017-138191
Jun. 21, 2018 (JP) .................. 2018-118101

(51) Int. Cl.
*B41J 2/05* (2006.01)
*C09D 11/326* (2014.01)
(Continued)

(52) U.S. Cl.
CPC ............... *B41J 2/05* (2013.01); *B41J 2/175* (2013.01); *B41J 2/18* (2013.01); *C09D 11/106* (2013.01);
(Continued)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 11/0015; B41J 11/002; B41J 2/161; B41J 2/1623; B41J 2202/00; B41J 2202/03; B41J 2/14201; B41J 2/045; C09D 11/36; C09D 11/40; C09D 11/30;
(Continued)

(56) References Cited

U.S. PATENT DOCUMENTS 7,637,603 B2  12/2009 Kawabe et al.
7,705,071 B2   4/2010 Nakagawa et al.
(Continued)

FOREIGN PATENT DOCUMENTS

JP   H05-017712 A   1/1993

*Primary Examiner* — Manish S Shah
(74) *Attorney, Agent, or Firm* — Venable LLP

(57) ABSTRACT

Provided is an ink jet recording method by which the decrease of degassing efficiency is suppressed even after images are recorded for a long period of time in a case where the degassing is performed while circulating an ink in an ink circulation system. An ink jet recording method recording an image on a recording medium by ejecting an ink from a recording head by using an ink jet recording apparatus equipped with an ink storage portion for storing the ink, the recording head for ejecting the ink, a unit for circulating the ink in an ink circulation system arranged between the ink storage portion and the recording head and a unit for degassing the ink circulating in the ink circulation system, the ink being an aqueous ink containing a pigment dispersed by an action of an anionic group, a resin particle and a specific water-soluble organic solvent.

17 Claims, 3 Drawing Sheets

(51) Int. Cl.
*C09D 11/322* (2014.01)
*B41J 2/175* (2006.01)
*C09D 11/38* (2014.01)
*B41J 2/18* (2006.01)
*C09D 11/106* (2014.01)
*C09D 11/107* (2014.01)

(52) U.S. Cl.
CPC .......... *C09D 11/107* (2013.01); *C09D 11/322* (2013.01); *C09D 11/326* (2013.01); *C09D 11/38* (2013.01)

(58) Field of Classification Search
CPC ....... C09D 11/38; C09D 11/32; C09D 11/322; C09D 11/324; C09D 11/328; C09D 11/101; C09D 11/102; C09D 11/005; C09D 11/54; C09D 11/52; B41M 5/0011; B41M 5/0017; B41M 5/0047; B41M 7/00; B41M 7/0072; B41M 5/52; B41M 5/5218

See application file for complete search history.

(56) References Cited

U.S. PATENT DOCUMENTS

| | | | |
|---|---|---|---|
| 2010/0165020 A1* | 7/2010 | Tojo | B41J 2/14233 347/9 |
| 2011/0187799 A1* | 8/2011 | Aoyama | C09D 11/324 347/84 |
| 2011/0306708 A1* | 12/2011 | Hiraishi | C09D 11/32 524/90 |
| 2013/0141498 A1* | 6/2013 | Mori | C09D 11/106 347/86 |
| 2018/0134907 A1 | 5/2018 | Saito et al. | |

* cited by examiner

INK JET RECORDING METHOD AND INK JET RECORDING APPARATUS

BACKGROUND OF THE INVENTION

Field of the Invention

The present invention relates to an ink jet recording method and an ink jet recording apparatus.

Description of the Related Art

In recent years, an ink jet recording apparatus has been increasingly used in office printing and commercial printing fields. In addition, for the ink jet recording apparatus, it is required to further speed up the recording speed. In order to improve the recording speed, an ink jet recording method that uses a line-type recording head (line head) and records an image in a so-called single-pass manner is advantageous rather than a multi-pass recording method that is performed by using a conventional serial-type recording head (serial head).

Regardless of the type of a recording head, in an ink jet recording method, when the period during which ejection from a certain nozzle is not performed (period of non-use) is prolonged, the ink gradually sticks. The stuck ink affects the ejection, therefore, it is required to perform a recovery operation of discharging the ink by preliminary ejection, suction, pressurization or the like to remove the stuck ink. However, due to the configuration of the apparatus, the line head has such a characteristic that it is difficult to perform a recovery operation during a period when ejection from a certain nozzle pauses or from a nozzle having a low ejection frequency.

With regard to the problem of ejection recoverability, it is effective to circulate the ink in an ink supply system including an ink storage portion and a recording head. This is because the ink is hard to stay, and further the drying of the ink is suppressed by continuously supplying the ink of which the water content is not decreased in the vicinity of a nozzle (ejection orifice) of the recording head. However, there is also a problem caused by adopting the ink circulation.

Into an ink in an ink jet recording apparatus, air is dissolved by coming into the ink contact with the atmosphere in the ejection orifice of the recording head or the ink storage portion. Further, even when air permeates the members constituting the ink supply system, the air is dissolved in the ink. In a case of a non-circulation system, the ink supplied from an ink storage portion to a recording head is normally discharged from the system by ejection or the like, therefore, the time to stay in the ink supply system is short. On the other hand, in a case of a circulation system, the ink remains in an ink supply system for a long period of time, therefore, the circulation is performed in a state that the dissolved air is present in the ink. Subsequently, due to the pressure change at the time when an ink passes through an ink flow path or the temperature change between the members, the dissolved air flows in the ink supply system as air bubbles and is supplied to the recording head, so that irregular ejection by the bubbles or non-ejection is generated.

As the countermeasure against bubbles, a countermeasure for reducing dissolved air by heating an ink in advance after the ink has been prepared or by reducing the pressure in a recording device, that is, degassing of the ink is the mainstream. For example, a method for removing the dissolved gas in the ink by using a gas permeable membrane has been proposed (Japanese Patent Application Laid-Open No. H05-017712).

The present inventors have investigated about the recording of an image in a single-pass manner by using a line head for the purpose of further increasing the recording speed. At this time, an image was recorded by using an ink containing a pigment as a coloring material, and performing degassing while circulating the ink in an ink circulation system. As a result, it was found that the ejection recoverability can be improved by performing degassing while performing circulation. However, it was understood that the degassing efficiency is decreased after images are recorded for a long period of time.

SUMMARY OF THE INVENTION

An object of the present invention is to provide an ink jet recording method by which the decrease of degassing efficiency is suppressed even after images are recorded for a long period of time in a case where the degassing is performed while circulating an ink in an ink circulation system. Further, another object of the present invention is to provide an ink jet recording apparatus to be used in the ink jet recording method.

The above-described objects are solved by the following present invention. That is, an ink jet recording method according to the present invention is an ink jet recording method recording an image on a recording medium by ejecting an ink from a recording head by using an ink jet recording apparatus equipped with an ink storage portion for storing the ink, the recording head for ejecting the ink, a unit for circulating the ink in an ink circulation system arranged between the ink storage portion and the recording head and a unit for degassing the ink circulating in the ink circulation system, wherein the ink is an aqueous ink containing a pigment dispersed by an action of an anionic group, a resin particle and a water-soluble organic solvent, and the water-soluble organic solvent containing a first water-soluble organic solvent having a relative dielectric constant of 34.0 or less.

According to the present invention, an ink jet recording method by which the decrease of degassing efficiency is suppressed even after images are recorded for a long period of time in a case where the degassing is performed while circulating an ink in an ink circulation system can be provided. Further, according to the present invention, an ink jet recording apparatus to be used in the ink jet recording method can be provided.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

Hereinafter, the present invention will be described in detail by referring to preferred embodiments. In the present invention, in a case where the compound is a salt, the salt is dissociated into ions in an ink, however, for convenience, it is expressed as "containing salt". Further, the ink for ink jet is sometimes simply referred to as "ink". The physical property values are values at ordinary temperature (25° C.) unless otherwise specifically noted.

Ink Jet Recording Method and Ink Jet Recording Apparatus

An ink jet recording apparatus according to the present invention is equipped with an ink storage portion for storing an ink, a recording head for ejecting the ink, a unit for circulating the ink in an ink circulation system arranged between the ink storage portion and the recording head and a unit for degassing the ink circulating in the ink circulation system. Further, the ink jet recording method according to the present invention is, for example, a method for recording an image by using the above-described ink jet recording apparatus and by ejecting an ink from the above-described recording head. That is, the ink jet recording method according to the present invention includes a step of circulating an ink in an ink circulation system, a step of degassing the ink circulating in the ink circulation system and a step of recording an image on a recording medium by ejecting the ink from a recording head.

Figure 1:
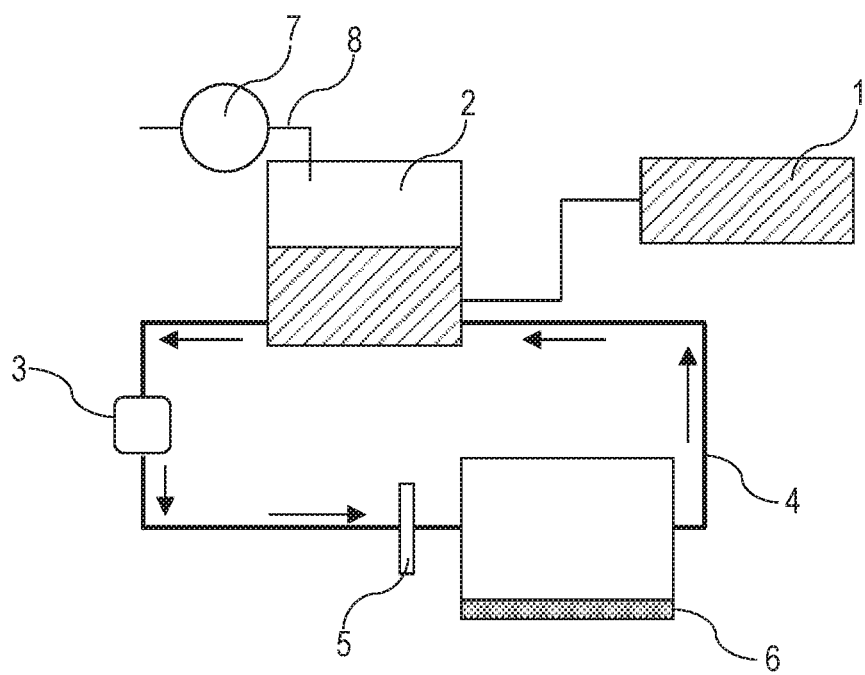
FIG. 1 is a schematic diagram illustrating an example of an ink supply system that performs circulation and degassing.
Figure 2:
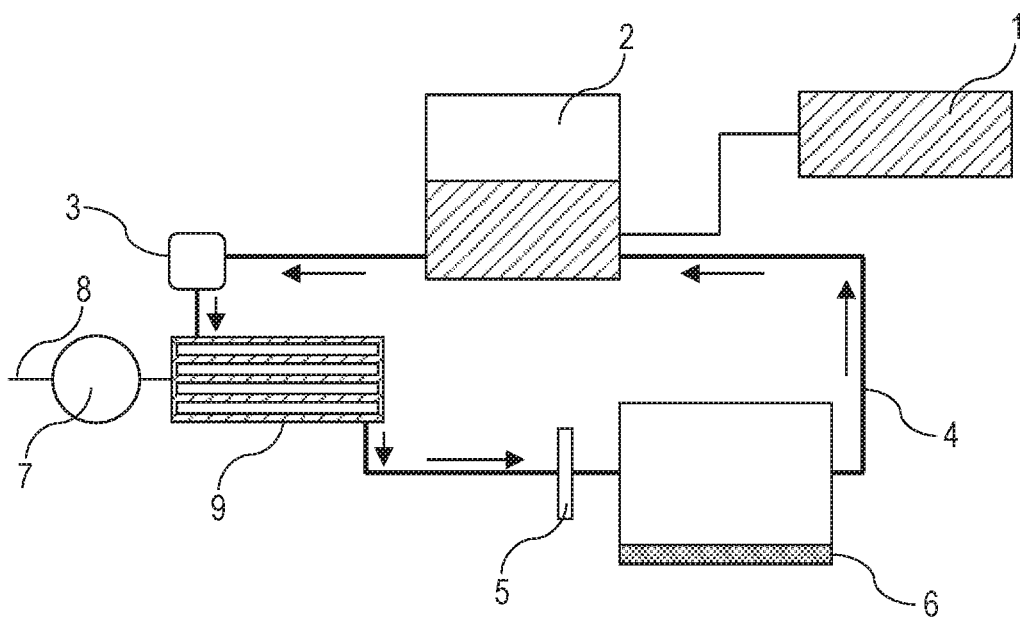
FIG. 2 is a schematic diagram illustrating another example of an ink supply system that performs circulation and degassing.

FIGS. 1 and 2 are schematic diagrams showing an example of an ink supply system that performs circulation and degassing. Hereinafter, the ink supply system will be described. Both of a main tank 1 and a sub tank 2 have a function as an ink storage portion. The ink sent from the main tank 1 to the sub tank 2 flows in an ink circulation system 4 in a direction of arrows in the diagram by a circulation pump 3, passes through a filter 5, and is sent to a recording head 6. The ink is ejected from the recording head 6 based on a record data, and an image is recorded on a recording medium (not shown). Further, the ink can also be discharged from a recording head 6 based on a preliminary ejection data. The ink that has not been discharged outside the system due to the image recording, the preliminary ejection or the like returns to the ink circulation system 4 again and is sent to the sub tank 2. In this way, the ink circulates in the ink circulation system arranged between the sub tank 2 and the recording head 6. The flow speed (flow rate) at the time of circulation may be appropriately determined depending on the configuration of the apparatus, and is set to be, for example, preferably 1 to 50 mL/min, and more preferably 1 to 10 mL/min. FIG. 1 shows a configuration in which an ink circulating in an ink circulation system is degassed by depressurizing a sub tank 2 with a degassing pump 7 connected to an atmosphere communication port 8. Further, FIG. 2 shows a configuration in which an ink circulating in an ink circulation system is degassed by using a degassing module 9 as a member formed of a hollow fiber or the like.

As the technique for performing the degassing inside an ink jet recording apparatus, a method of depressurizing the ink storage portion, a method of using a degassing module or the like can be mentioned.

In the method of depressurizing the ink storage portion, a method of depressurizing an ink storage portion such as a sub tank, a method in which other ink storage portions for performing degassing is provided between a sub tank and a recording head and between the recording head and the sub tank (in an ink circulation system) are arranged, and the insides of the ink storage portions are depressurized or the like can be mentioned. In order to lower the solubility of the gas and to facilitate the degassing, the ink storage portion for performing the degassing may be heated. In addition, in order to increase the surface area of the liquid and further to facilitate the escape of air bubbles, the ink in the ink storage portion may be stirred by using a stirrer or the like, or the ink storage portion may be vibrated.

In the method of using a degassing module, a hollow fiber is preferably used. As the hollow fiber, a member obtained by bundling a fiber-like material having a hollow structure, which has a function of permeating gas without permeating liquid, can be used. As the constituent material of the hollow fiber, an olefin-based resin, a silicone-based resin, a fluorine-based resin or the like can be mentioned. As the reflux system of the hollow fiber, an internal reflux system in which along with passing an ink through the inside of the hollow fiber, the outside is depressurized for degassing; and an external reflux system in which along with passing an ink through the outside of the hollow fiber, the inside is depressurized for degassing can be mentioned. In consideration of the type and inner diameter of the hollow fiber to be used, and the physical properties of an ink such as viscosity, the liquid-passage rate may be appropriately set so as to match with the desired amount of dissolved air.

Examples of the pump for depressurization include a syringe pump, a tube pump, a diaphragm pump and a vacuum pump. These pumps can be used in both of the method of depressurizing the ink storage portion and the method of using a degassing module. In order to reduce the dissolved air and air bubbles of the ink supplied to a recording head, a degassing unit is preferably arranged on the upstream side of the recording head in an ink circulation system. The degassing level can be adjusted by the type of the pump, the degassing system, the degassing time or the like. Although depending on the conditions of the recording head, it is preferred that the degassing is performed so that the amount of the dissolved air in the ink (can be measured as an amount of dissolved oxygen) is 6.0 mg/L or less, and suitably 5.0 mg/L or less.

The present inventors have investigated that an ink containing a pigment is applied to an ink jet recording apparatus that performs degassing while circulating the ink in an ink circulation system, and images are recorded over a long period of time. As a result, it was found that the degassing efficiency is decreased. As a result of analyzing the reason for this, it was found that the decrease of degassing efficiency is caused because air bubbles cannot be removed even though the degassing is performed, and further because clogging of an aggregate of a pigment is generated. More specifically, it is presumed that the degassing efficiency was decreased since the following phenomenon was generated.

Figure 3A:
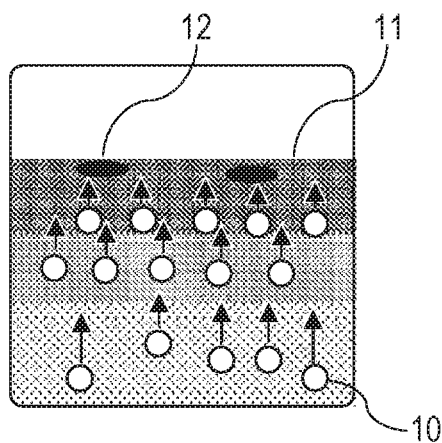
FIGS. 3A, 3B, 3C and 3D are schematic diagrams for describing a state of a gas-liquid interface in a degassing unit.
Figure 3B:
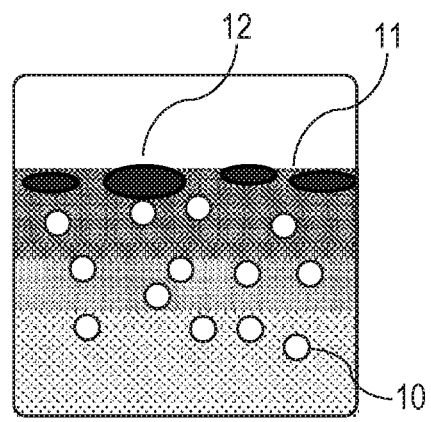
Figure 3C:
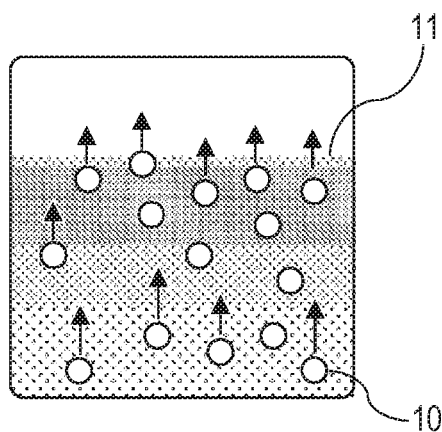
Figure 3D:
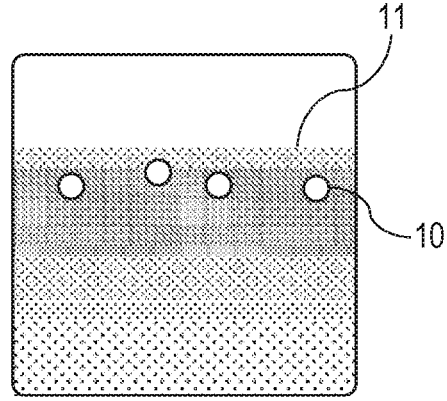

FIGS. 3A to 3D are schematic diagrams for describing a state of a gas-liquid interface in a degassing unit. FIGS. 3A and 3B show the case of using a conventional ink, FIG. 3A is a diagram showing a state that is close to the state at the time point at which recording was started, and FIG. 3B is a diagram showing a state that is close to the state after recording was performed for a long period of time. Further, FIGS. 3C and 3D show the case of using an ink in the present invention, FIG. 3C is a diagram showing a state that is close to the state at the time point at which recording was started, and FIG. 3D is a diagram showing a state that is close to the state after recording was performed for a long period of time.

In any case, when the inside of a degassing unit (a sub tank 2 in FIG. 1 and a degassing module 9 in FIG. 2) is depressurized, water that is a component having the highest vapor pressure among the constituent components of an aqueous ink is evaporated from a gas-liquid interface 11. In this way, also in both of the cases shown in FIGS. 3A and 3C, a portion in which a pigment is concentrated and an ink is thickened is generated in the vicinity of the gas-liquid interface 11. In this portion, the movement of air bubbles 10 is easily hindered after the air dissolved in a portion far from the gas-liquid interface 11 becomes the air bubbles 10, therefore, the portion tends to be a factor of decreasing the degassing efficiency. However, the viscosity is not increased much in the short term, therefore, the thickened ink diffuses due to the flow of the ink, so that the degassing can be performed without much of a problem.

However, in a case of using a conventional ink, in a state shown in FIG. 3B after recording was performed for a long period of time, the following phenomenon is generated. That is, even though circulation and degassing have been continuously performed, pigment particles of which the dispersion state has become unstable are generated due to concentration of the pigment or thickening of an ink in the ink in a portion stayed in a part with less movement and stagnation, aggregation progresses using the pigment particle as the nucleus, and an aggregate 12 is formed. The aggregation further progresses using such an aggregate 12 as the nucleus, and the ink also thickens with this, so that the viscosity of the ink in the vicinity of a gas-liquid interface 11 becomes extremely high, and a layer of the thickened ink also becomes thick. As a result, the movement of air bubbles 10 is remarkably hindered, so that the degassing efficiency is decreased.

In a case where a hollow fiber degassing module 9 is used as a degassing unit, the evaporation of water from a gas-liquid interface is easily suppressed, however, the hollow fiber is also gradually damaged after recording was performed for a long period of time. Subsequently, in a portion where the hollow fiber and the ink are in contact with each other, accumulation of slight water evaporation or a damaged portion triggers the generation of the pigment of which the dispersion state has become unstable, and an aggregate 12 adheres to the hollow fiber. After that, the degassing efficiency is decreased for the similar reason to that as described above.

In response to the problem that the degassing efficiency is decreased, the present inventors have investigated that in order to increase the degassing efficiency, the time during which the ink is present in a degassing unit is prolonged, or the ink is heated during the degassing. However, with these countermeasures, concentration of the pigment and thickening of the ink are promoted, so that not only the effect cannot be obtained but also the degassing efficiency is further decreased.

Therefore, the present inventors have investigated the ink composition regarding the problem of decreasing the degassing efficiency, which is generated peculiarly in a case where the degassing is performed while circulating an ink in an ink circulation system by using the ink containing a pigment. As a result, it was found that the above problem can be solved by an ink having a composition of containing a pigment dispersed by an action of an anionic group, a resin particle and a first water-soluble organic solvent having a relative dielectric constant of 34.0 or less. The present inventors are presumed that the reason why such an effect can be obtained is as follows.

A pigment dispersed by an action of an anionic group is selected as a coloring material to be contained in an ink, and the pigment is combined with a first water-soluble organic solvent having a relative dielectric constant of 34.0 or less. With such an ink composition, the thickening of the ink in the vicinity of a gas-liquid interface 11 is easily suppressed even after recording was performed for a long period of time (FIG. 3D). This is because when the inside of a degassing unit (a sub tank 2 in FIG. 1 and a degassing module 9 in FIG. 2) is depressurized, water is evaporated from the gas-liquid interface 11. At this time, in the vicinity of the gas-liquid interface 11, as the water that is a component having a high relative dielectric constant is decreased, the components other than the water become in a state of being concentrated, so that the relative dielectric constant of the ink is lowered as compared with that of the ink in a portion far from the gas-liquid interface 11. As a result, the pigment dispersed by an action of an anionic group moves to an environment in which it is easy to stably maintain the dispersion state, that is, to a portion far from the gas-liquid interface and having a high relative dielectric constant, a so-called "retreat phenomenon" is generated. Subsequently, the amount of the pigment that is present in an ink in a portion slightly away from the portion closest to the gas-liquid interface 11 is larger than that of the pigment that is present in an ink in the portion closest to the gas-liquid interface 11, therefore, the ink in the vicinity of the gas-liquid interface 11 is not so much thickened.

In addition to this, even if the concentration of a pigment or the thickening of an ink is generated by containing a resin particle in the ink, the resin particle enters between the pigment particles, so that firm aggregation of the pigment can be suppressed. As described above, because of the presence of a first water-soluble organic solvent, a retreat phenomenon is generated and an ink is hardly thickened, therefore, the aggregate is hardly formed, but even if the aggregate is formed, the aggregate is soft. Accordingly, the aggregate is easy to move even in a thickened ink, and further the resin particle play a role as of a cushion, so that air bubbles are hardly prevented from the escape.

That is, the retreat phenomenon of a pigment and the action of improving the escape of air bubbles due to the resin particle is generated together, therefore, in the present invention, the effect of suppressing the decreasing of the degassing efficiency can be obtained even after recording was performed for a long period of time. On the other hand, in an ink containing no first water-soluble organic solvent, the formation of the aggregate at the gas-liquid interface cannot be suppressed, so that the movement of air bubbles is hindered and the degassing efficiency becomes insufficient. In addition, even if the first water-soluble organic solvent is contained, firm aggregate is formed in an ink containing no resin particle, so that the movement of air bubbles is hindered and the degassing efficiency becomes insufficient.

Ink

The ink used in the ink jet recording method and ink jet recording apparatus according to the present invention is an aqueous ink for ink jet that contains a pigment dispersed by an action of an anionic group, a resin particle and a first water-soluble organic solvent having a relative dielectric constant of 34.0 or less. The ink used in the present invention is not required to be a so-called "curable ink". Therefore, the ink used in the present invention may not contain a compound such as a polymerizable monomer that can be polymerized by addition of external energy. Hereinafter, each of the components constituting the ink and physical properties of the ink will be described in detail.

Pigment Dispersed by Action of Anionic Group

The coloring material contained in an ink is a pigment dispersed by an action of an anionic group. The term "pigment dispersed by an action of an anionic group" in the present specification is referred to as a pigment in a state of being dispersed by a dispersion system using the action of an anionic group. As the dispersion system of a pigment, a resin-dispersed pigment using a resin as a dispersing agent, a self-dispersible pigment in which a hydrophilic group is bonded to a particle surface of the pigment or the like can be used. In addition, for example, a resin-bonded type pigment in which an organic group containing a resin is chemically bonded to a particle surface of the pigment, a microcapsule pigment in which a particle surface of the pigment is coated with a resin or the like can be used. That is, the term "pigment dispersed by an action of an anionic group" in the present specification means that a resin dispersant having an anionic group or the like is used as long as it is a dispersion system using a dispersing agent. Further, the term "pigment dispersed by an action of an anionic group" in the present specification means a pigment having an anionic group as long as it is a dispersion system using no dispersing agent, that is, a self-dispersible pigment.

In a case of a dispersion system using a dispersing agent, as the dispersing agent for dispersing a pigment in an aqueous medium, a resin dispersant or the like that can disperse a pigment in an aqueous medium by an action of an anionic group is used. As the resin dispersant, suitably, a resin constituted of a unit selected from the following ones is used as the constituent unit of the resin particle. Among them, a resin having a hydrophilic unit derived from (meth) acrylic acid and a hydrophobic unit derived from at least one of a monomer having an aromatic ring and a (meth)acrylic acid ester-based monomer is preferred. In particular, a resin having a hydrophilic unit derived from (meth)acrylic acid and a hydrophobic unit derived from a monomer of at least one of styrene and a-methyl styrene is preferred. Further, suitably, a water-soluble resin is used. Whether the resin is water-soluble or not can be determined in accordance with the determination method of the "resin particle" described later. The content (% by mass) of the pigment is preferably 0.3 times or more to 10.0 times or less in terms of mass ratio relative to the content of the resin dispersant.

As the dispersion system using no dispersing agent, that is, as the self-dispersible pigment, one in which an anionic group such as a carboxylic acid group, a sulfonic acid group and a phosphonic acid group is bonded to a particle surface of a pigment directly or through another atomic group (—R—) is used. The anionic group may be either an acid type or a salt type, and in a case of a salt type, the anionic group may be either in a state that a part of them is dissociated or in a state that all of them are dissociated. As the cation to be a counter ion in a case where the anionic group is a salt type, an alkali metal cation, ammonium, an organic ammonium and the like can be mentioned. Further, specific examples of the another atomic group (—R—) include a linear or branched alkylene group having 1 to 12 carbon atoms; an arylene group such as a phenylene group and a naphthylene group; a carbonyl group; an imino group; an amide group; a sulfonyl group; an ester group; and an ether group. Further, a group obtained by combining these groups may also be used.

The content of the pigment in the ink is preferably 0.5% by mass or more to 15.0% by mass or less, and more preferably 1.0% by mass or more to 10.0% by mass or less, with respect to the total mass of the ink.

Specific examples of the pigment include an inorganic pigment such as carbon black and titanium oxide; an organic pigment such as azo, phthalocyanine, quinacridone, isoindolinone, imidazolone, diketopyrrolopyrrole and dioxazine.

Resin Particle

The ink contains a resin particle. Examples of the resin forming the resin particle include an acrylic resin, a urethane-based resin and an olefin-based resin. Among them, an acrylic resin and a urethane resin are preferred, and an acrylic resin is particularly preferred.

As the acrylic resin, an acrylic resin having a hydrophilic unit and a hydrophobic unit as the constituent units is preferred. Among them, a resin having a hydrophilic unit derived from (meth)acrylic acid and a hydrophobic unit derived from at least one of a monomer having an aromatic ring and a (meth)acrylic acid ester-based monomer is preferred. In particular, a resin having a hydrophilic unit derived from (meth)acrylic acid and a hydrophobic unit derived from a (meth)acrylic acid ester-based monomer is preferred.

The hydrophilic unit is a unit having a hydrophilic group such as an anionic group. The hydrophilic unit can be formed by polymerizing, for example, a hydrophilic monomer having a hydrophilic group. Specific examples of the hydrophilic monomer having a hydrophilic group include an acidic monomer having a carboxylic acid group, such as (meth)acrylic acid, itaconic acid, maleic acid and fumaric acid and an anionic monomer such as an anhydride or salt of these acidic monomers. As the cation constituting the salt of the acidic monomer, an ion of lithium, sodium, potassium, ammonium, organic ammonium or the like can be mentioned. The hydrophobic unit is a unit having no hydrophilic group such as an anionic group. The hydrophobic unit can be formed by polymerizing, for example, a hydrophobic monomer having no hydrophilic group such as an anionic group. Specific examples of the hydrophobic monomer include a monomer having an aromatic ring, such as styrene, α-methyl styrene, benzyl (meth)acrylate; and a (meth)acrylic acid ester-based monomer such as methyl (meth)acrylate, butyl (meth)acrylate and 2-ethylhexyl (meth)acrylate.

As the resin particle, cross-linked resin particle are preferably used. The cross-linked resin particle can firmly keep the shape even when entering between pigment particles. Therefore, since the function of softening the aggregate is excellent, the air resin particle further improved. In order to cross-link the resin particle, a unit derived from a cross-linkable monomer may be incorporated in a resin. As the cross-linkable monomer, a monomer having two or more ethylenically unsaturated bonds can be mentioned. Specifically, a diene such as butadiene and isoprene; a bifunctional alkyl (meth)acrylate such as 1,4-butanediol di(meth)acrylate, (mono-, di-, tri- and poly-)ethylene glycol di(meth) acrylates and (mono-, di-, tri- and poly-)propylene glycol di(meth)acrylates; a trifunctional alkyl (meth)acrylate such as trimethylolpropane tri(meth)acrylate and ethylene oxide-modified trimethylolpropane tri(meth)acrylate; divinylbenzene; or the like can be mentioned.

The urethane-based resin can be obtained by reacting, for example, a polyisocyanate with a polyol. Further, the urethane-based resin may be one obtained by further reacting with a chain extender. Examples of the olefin-based resin include polyethylene and polypropylene.

The term "resin particle" in the present specification means that the resin is present in an aqueous medium in a state that particles capable of measuring the particle diameter by a dynamic light scattering method are formed in a case of being neutralized with an alkali in an equimolar amount corresponding to the acid value. Whether the resin is water-soluble or water-dispersible (resin particle) can be determined in accordance with the following method. At first, a liquid (resin solid content: 10% by mass) containing a resin neutralized with an alkali (sodium hydroxide, potassium hydroxide or the like) corresponding to the acid value is prepared. Next, a sample solution is prepared by diluting the prepared liquid to 10 times (volume basis) with pure water. In addition, in a case where the particle diameter of the resin in the sample solution is measured by the dynamic light scattering method, the resin can be determined to be water-soluble when a particle having a particle diameter has not been measured. The measurement conditions at this time can be set, for example, as follows: Set Zero: 30 seconds, the number of times of measurement: 3 times and measurement time: 180 seconds. As the particle size distribution analyzer, a particle size analyzer (for example, trade name "UPA-EX150", manufactured by NIKKISO CO., LTD.) by a dynamic light scattering method or the like can be used. Of course, the particle size distribution analyzer to be used, the measurement conditions and the like are not limited to the above.

In addition, whether the resin particle is cross-linked or not can be grasped by a gel fraction of the resin. The gel fraction of the resin is determined by taking the remaining component without being dissolved when a resin is dissolved in a good solvent as "gel", and by calculating the ratio (% by mass) of the mass of the gel to the mass of the resin used as a sample. A resin having a similar composition is prepared except that the unit derived from the cross-linkable monomer is replaced with a unit derived from a non cross-linkable monomer having an equivalent molecular weight, and the gel fraction is measured for this resin. In addition, this gel fraction is compared with the gel fraction measured for cross-linked resin particle (resin not replacing the unit), and if the latter is larger, it can be said that the resin particle are cross-linked.

The gel fraction is calculated as follows. A resin and water are mixed to prepare a liquid containing the resin. Using this liquid, a film (mass B) of the resin having a uniform thickness is prepared and dry-solidified. This film is placed in an environment of a temperature of 23° C. for 24 hours in a state of being immersed in a good solvent. After that, from the remaining resin (gel, mass A) without being dissolved, the gel fraction (% by mass) is calculated on the basis of the equation of A/B×100 (%). The lower limit of the gel fraction is 0% by mass, and the upper limit is 100% by mass. In a case of an acrylic resin, tetrahydrofuran or the like can be used as the good solvent. Further, in a case of a urethane-based resin, methyl ethyl ketone or the like can be used as the good solvent.

The content (% by mass) of resin particle in an ink is preferably 0.10% by mass or more to 20.00% by mass or less, and more preferably 0.50% by mass or more to 15.00% by mass or less, with respect to the total mass of the ink. Further, the content (% by mass) of resin particle in the ink is preferably 0.10 times or more in terms of mass ratio relative to the content (% by mass) of a pigment. When the mass ratio is 0.10 times or more, since the function of softening the aggregate is excellent, the air bubbles are more hardly prevented from the escape, and the degassing efficiency can be further improved.

The surface charge amount of the resin particle is preferably 160 µmol/g or less. If the surface charge amount is more than 160 µmol/g, a retreat phenomenon is easily generated due to the similar reason to that for the pigment when water is evaporated due to degassing. Subsequently, the resin particle hardly enter between the pigment particles, the function of softening the aggregate is hardly exerted, and air bubbles slightly hardly escape, therefore, there may be a case where the degassing efficiency is decreased. The surface charge amount of the resin particle is preferably 5 µmol/g or more, and more preferably 10 µmol/g or more.

The surface charge amount of resin particle can be measured and calculated in accordance with the following method. At first, hydrochloric acid is added to an aqueous dispersion of resin particle until the pH becomes 2 or less, and the resultant mixture is stirred for 24 hours. After that, the precipitate is separated by centrifugation, and dried to obtain a resin. One g of the obtained resin is pulverized, 30 g of a 0.1 mol/L aqueous sodium hydrogen carbonate solution is added to the pulverized resin, and the resultant mixture is stirred for 15 hours. After that, the stirred mixture is subjected to centrifugation, and the supernatant is collected. Pure water is added to 1 g of the collected supernatant to prepare a 15 g of sample. The obtained sample is titrated with 0.1 mol/L hydrochloric acid, and the surface charge amount per unit mass of resin particle is calculated from the measurement value. In addition, the above-described various kinds of analyses may be performed using a resin extracted from an ink by an appropriate method.

Water-Soluble Organic Solvent

The ink contains a water-soluble organic solvent. The water-soluble organic solvent contains a first water-soluble organic solvent having a relative dielectric constant at 25° C. of 34.0 or less.

The relative dielectric constant of a water-soluble organic solvent can be measured under the condition of a frequency of 10 kHz by using a dielectric constant meter (for example, trade name "BI-870" (manufactured by BROOKHAVEN INSTRUMENTS CORPORATION) or the like). Note that the relative dielectric constant of a water-soluble organic solvent that is solid at 25° C. is a value obtained by measuring the relative dielectric constant of a 50% by mass aqueous solution and by calculating from the following equation (A). Usually, the term "water-soluble organic solvent" means a liquid, but in the present invention, ones that are solid at 25° C. (ordinary temperature) are also included in the water-soluble organic solvent.

$$\varepsilon_{sol} = 2\varepsilon_{50\%} - \varepsilon_{water} \tag{A}$$

$\varepsilon_{sol}$: a relative dielectric constant of a water-soluble organic solvent being solid at 25° C.

$\varepsilon_{50\%}$: a relative dielectric constant of a 50% by mass aqueous solution of a water-soluble organic solvent being solid at 25° C.

$\varepsilon_{water}$: a relative dielectric constant of water

As the specific examples of the water-soluble organic solvent that is solid at 25° C., which is generally used in aqueous ink, 1,6-hexanediol, trimethylol propane, ethylene urea, urea, polyethylene glycol having a number average molecular weight of 1,000 or the like can be mentioned.

The reason for calculating the relative dielectric constant of a water-soluble organic solvent that is solid at 25° C. from the relative dielectric constant of a 50% by mass aqueous solution is as follows. Among the water-soluble organic solvents that are solid at 25° C., in those that can be constituent components of an aqueous ink, there are some water-soluble organic solvents from which an aqueous solution having a high concentration of more than 50% by mass is difficult to be prepared. On the other hand, the relative dielectric constant of water becomes dominant in an aqueous solution having a low concentration of 10% by mass or less, and it is difficult to obtain a probable (effective) relative dielectric constant value of the water-soluble organic solvent. Therefore, as a result of investigations by the present inventors, it was found that most of the water-soluble organic solvents that are solid at 25° C. and used for an ink can prepare an aqueous solution to be measured, and further, the relative dielectric constant to be calculated also matches with the effect of the present invention. Due to the above reasons, in the present invention, the relative dielectric constant of the water-soluble organic solvent that is solid at 25° C. is calculated from the relative dielectric constant of an 50% by mass aqueous solution to be used. Even if it is a water-soluble organic solvent that is solid at 25° C., for those that have low solubility in water and cannot prepare a 50% by mass aqueous solution, the relative dielectric constant value calculated in accordance with the case of calculating the above $\varepsilon_{sol}$ by using an aqueous solution at a saturated concentration is used for convenience.

Specific examples of the first water-soluble organic solvent having a relative dielectric constant of 34.0 or less include trimethylol propane (33.7), methanol (33.1), N-methyl-2-pyrrolidone (32.0), triethanolamine (31.9), diethylene glycol (31.7), 1,4-butanediol (31.1), 1,3-butanediol (30.0), 3-methylsulfolane (29.0), 1,2-propanediol (28.8), 1,2,6-hexanetriol (28.5), 2-methyl-1,3-propanediol (28.3), 2-pyrrolidone (28.0), 1,5-pentanediol (27.0), 3-methyl-1,3-butanediol (24.0), 3-methyl-1,5 -pentanediol (23.9), ethanol (23.8), 1-(hydroxymethyl)-5,5-dimethylhydantoin (23.7), triethylene glycol (22.7), tetraethylene glycol (20.8), polyethylene glycol having a number average molecular weight of 200 (18.9), 2-ethyl-1,3-hexanediol (18.5), isopropanol (18.3), 1,2-hexanediol (14.8), n-propanol (12.0), polyethylene glycol having a number average molecular weight of 600 (11.4), triethylene glycol monobutyl ether (9.8), tetraethylene glycol monobutyl ether (9.4), tripropylene glycol monomethyl ether (8.5), 1,6-hexanediol (7.1) and polyethylene glycol having a number average molecular weight of 1,000 (4.6) (numerical values in the parentheses represent relative dielectric constants at 25° C.). The relative dielectric constant of the first water-soluble organic solvent is preferably 3.0 or more.

Among the first water-soluble organic solvents, one having a relative dielectric constant of 27.0 or less is preferably used. By using the one having a relative dielectric constant of 27.0 or less as the first water-soluble organic solvent, a retreat phenomenon is more easily generated when water is evaporated due to degassing, and the decreasing of the degassing efficiency can be effectively suppressed. In addition, when a water-soluble organic solvent that is hardly evaporated from a gas-liquid interface during depressurization is used, a retreat phenomenon is more easily generated, and the decreasing of the degassing efficiency can be effectively suppressed. Accordingly, as the first water-soluble organic solvent, one having a vapor pressure at 25° C. of lower than that of water is preferably used.

The content (% by mass) of the first water-soluble organic solvent in an ink is preferably 0.10% by mass or more to 20.00% by mass or less, and more preferably 0.50% by mass or more to 10.00% by mass or less, with respect to the total mass of the ink. The content (% by mass) of the first water-soluble organic solvent in the ink is preferably 0.10 times or more in terms of mass ratio relative to the content (% by mass) of a pigment. When the mass ratio is less than 0.10 times, a retreat phenomenon is hardly generated when water is evaporated due to degassing, and there may be a case where the decreasing of the degassing efficiency cannot be effectively suppressed. The mass ratio is preferably 20.00 times or less.

Calcium Ion

A calcium ion may be present in an ink due to a factor of, for example, contamination from an ink constituent material such as a pigment, a resin and a water-soluble organic solvent, elution from a member in contact with an ink or the like. In a case where ink circulation is performed, the calcium ion mixed in the ink are easily concentrated, and easily influence on the ink. Even under such a circumstance, as long as the content (ppm) of the calcium ion in the ink is 120 ppm or less, the decreasing of the degassing efficiency can be effectively suppressed even after images are recorded over a long period of time. If the content is more than 120 ppm, when water is evaporated due to degassing, the dispersion state of a pigment easily becomes unstable in the vicinity of a gas-liquid interface, and the ink is thickened, or the aggregate is generated, and there may be a case where the decreasing of the degassing efficiency cannot be effectively suppressed. The content of the calcium ion is a content of the ink before circulation, and can be measured by ICP emission spectroscopy or the like.

Aqueous Medium

The ink is an aqueous ink containing an aqueous medium that is a mixed solvent of water and a water-soluble organic solvent. As the water, deionized water or ion exchanged water is preferably used. The content (% by mass) of water in the aqueous ink is preferably 50.00% by mass or more to 95.00% by mass or less, with respect to the total mass of the ink.

The water-soluble organic solvent contains a first water-soluble organic solvent having a relative dielectric constant of 34.0 or less. The water-soluble organic solvent is not particularly limited as long as it is water-soluble, and as the water-soluble organic solvent, any water-soluble organic solvent that can be used for an ink for ink jet, such as alcohols, (poly)alkylene glycols, glycol ethers, nitrogen-containing compounds and sulphur-containing compounds can be used. The content (% by mass) of the water-soluble organic solvent (first water-soluble organic solvent) in an aqueous ink is preferably 3.00% by mass or more to 50.00% by mass or less, with respect to the total mass of the ink.

Specific examples of the water-soluble organic solvent (including specific examples of the first water-soluble organic solvent) include monohydric alcohols having 1 to 4 carbon atoms such as methanol (33.1), ethanol (23.8), n-propanol (12.0), isopropanol (18.3), n-butanol, sec-butanol and tert-butanol; dihydric alcohols such as 1,2-propanediol (28.8), 1,3-butanediol (30.0), 1,4-butanediol (31.1), 1,5-pentanediol (27.0), 1,2-hexanediol (14.8), 1,6-hexanediol (7.1), 2-methyl-1,3-propanediol (28.3), 3-methyl-1,3-butanediol (24.0), 3-methyl-1,5-pentanediol (23.9) and 2-ethyl-1,3-hexanediol (18.5); polyhydric alcohols such as 1,2,6-hexanetriol (28.5), glycerin (42.3), trimethylol propane (33.7) and trimethylolethane; alkylene glycols such as ethylene glycol (40.4), diethylene glycol (31.7), triethylene glycol (22.7), tetraethylene glycol (20.8), butylene glycol, hexylene glycol and thiodiglycol; glycol ethers such as diethylene glycol monomethyl ether, diethylene glycol monoethyl ether, triethylene glycol monoethyl ether and triethylene glycol monobutyl ether (9.8); polyalkylene glycols having a number average molecular weight of 200 to 1,000 such as polyethylene glycol having a number average molecular weight of 200 (18.9), polyethylene glycol having a number average molecular weight of 600 (11.4), polyethylene glycol having a number average molecular weight of 1,000 (4.6) and polypropylene glycol; nitrogen-containing compounds such as 2-pyrrolidone (28.0), N-methyl-2-pyrrolidone (32.0), 1-(2-hydroxyethyl)-2-pyrrolidone (37.6), 1,3-dimethyl-2-imidazolidinone, N-methylmorpholine, urea (110.3), ethylene urea (49.7), triethanolamine (31.9), 1-hydroxymethyl-5,5-dimethylhydantoin (23.7) and 1,3-bis(2-hydroxyethyl)-5,5-dimethylhydantoin (16.0); sulphur-containing compounds such as dimethyl sulfoxide (48.9) and bis(2-hydroxyethyl sulfone); and cyclic ethers such as y-butyrolactone (41.9) (numerical values in the parentheses represent relative dielectric constants at 25° C.). The relative dielectric constant of the water-soluble organic solvent (excluding the first water-soluble organic solvent) is preferably 3.0 or more. As the water-soluble organic solvent to be contained in an ink, one having a vapor pressure at 25° C. of lower than that of water is preferably used.

Other Additive Agents

The ink may contain various additive agents such as an antifoaming agent, a surfactant, a pH adjusting agent, a viscosity modifier, a rust-preventive agent, an antiseptic agent, an antifungal agent, an antioxidant and a reduction inhibitor as necessary, in addition to the above-described components.

Physical Properties of Ink

The ink used in the present invention is an aqueous ink for ink jet recording. Therefore, it is preferred that the physical properties are appropriately controlled. Specifically, the surface tension of the ink at 25° C. is preferably 20 mN/m or more to 60 mN/m or less. The viscosity of the ink at 25° C. is preferably 1.0 mPa·s or more to 8.0 mPa·s or less. The pH of the ink at 25° C. is preferably 7.0 or more to 9.5 or less.

EXAMPLES

Hereinafter, the present invention will be described in more detail by referring to Examples and Comparative Examples, however, the present invention is not limited at all by the following Examples as long as the gist of the present invention is not exceeded. As to the amount of component, the described "parts" and "%" are based on a mass unless otherwise specifically noted.

Preparation of Pigment Dispersion Liquid

Pigment Dispersion Liquid 1

Into a four-necked flask equipped with a stirrer, a nitrogen inlet tube, a reflux condenser and a thermometer, 100.0 parts of ethylene glycol monobutyl ether was placed. 80.0 parts of styrene and 20.0 parts of acrylic acid were mixed to obtain a mixture of monomers. The inside of the above-described flask was purged with nitrogen gas and heated to 110° C., and then the mixture of monomers and 1.3 parts of t-butyl peroxide (polymerization initiator) were added dropwise into the flask over 3 hours under stirring. After that, aging was performed for 2 hours, and the ethylene glycol monobutyl ether was removed under reduced pressure. In this way, a water-soluble resin 1 having an anionic group, an acid value of 160 mgKOH/g and a weight average molecular weight of 10,000 was obtained. Into 20.0 parts of a resin 1, 80.0 parts of pure water containing potassium hydroxide that is an equimolar amount corresponding to the acid value was added and dissolved to obtain an aqueous solution of a resin 1 in which a content of a resin (solid content) is 20.0%.

By mixing 10.0 parts of carbon black, 25.0 parts of the above-obtained aqueous solution of a resin 1 and 65.0 parts of ion exchanged water, a mixture was obtained. As the carbon black, one having a specific surface area of 220 m$^2$/g and a DBP oil absorption of 105 mL/100 g was used. The obtained mixture was dispersed for 1 hour by using a sand grinder, and then the resultant dispersion was subjected to centrifugation and coarse particles were removed. Further, the resultant preparation was subjected to pressure filtration with a microfilter having a pore size of 3.0 μm (manufactured by Fujifilm Corporation), and a pigment dispersion liquid 1 in a state that a pigment was dispersed in water by the resin was obtained. In the pigment dispersion liquid 1, the content of the pigment was 15.0% and the content of the resin dispersant was 7.5%.

Pigment Dispersion Liquid 2

In a similar manner as in the above-described pigment dispersion liquid 1 except that the pigment was changed to C.I. Pigment Blue 15:3, a pigment dispersion liquid 2 in which a content of a pigment is 15.0% and a content of a resin dispersant is 7.5% was prepared.

Pigment Dispersion Liquid 3

In a similar manner as in the above-described pigment dispersion liquid 1 except that the pigment was changed to C.I. Pigment Red 122, a pigment dispersion liquid 3 in which a content of a pigment is 15.0% and a content of a resin dispersant is 7.5% was prepared.

Pigment Dispersion Liquid 4

In a similar manner as in the above-described pigment dispersion liquid 1 except that the pigment was changed to C.I. Pigment Yellow 74, a pigment dispersion liquid 4 in which a content of a pigment is 15.0% and a content of a resin dispersant is 7.5% was prepared.

Pigment Dispersion Liquid 5

A solution in which 5.0 g of concentrated hydrochloric acid had been dissolved in 5.5 g of water was cooled to 5° C., and into the resultant mixture, 0.91 g of 4-aminophthalic acid was added. The container in which the solution had been put was placed into an ice bath, and while maintaining the temperature of the solution at 10° C. or less by stirring, a solution obtained by dissolving 1.8 g of sodium nitrite in 9.0 g of ion exchanged water at 5° C. was added into the container. After stirring for 15 minutes, into the resultant mixture, 6.0 g of carbon black (having a specific surface area of 220 m$^2$/g and a DBP oil absorption of 105 mL/100 g) was added under stirring, and the mixture was further stirred for 15 minutes to obtain a slurry. The obtained slurry was filtered with filter paper (trade name "Filter Paper No. 2 for Standard" manufactured by ADVANTEC Co., LTD.), and the particles were thoroughly washed with water and dried in an oven at 110° C. After that, sodium ions were replaced with potassium ions by an ion exchange method, and a self-dispersible pigment in which a —$C_6H_3$—$(COOK)_2$ group had been bonded to a particle surface of the pigment was obtained. An adequate amount of water was added to adjust the content of the pigment, and a pigment dispersion liquid 5 in which a content of the pigment is 15.0% was obtained.

Pigment Dispersion Liquid 6

Into a four-necked flask equipped with a stirrer, a nitrogen inlet tube, a reflux condenser and a thermometer, 100.0 parts of ethylene glycol monobutyl ether was placed. By mixing 80.0 parts of styrene and 20.0 parts of polyethylene glycol (20.0 mol-added) acrylate, a mixture of monomers was obtained. The inside of the above-described flask was purged with nitrogen gas and heated to 110° C., and then the mixture of monomers and 1.3 parts of t-butyl peroxide (polymerization initiator) were added dropwise into the flask over 3 hours under stirring. After that, aging was performed for 2 hours, and the ethylene glycol monobutyl ether was removed under reduced pressure. In this way, a water-soluble resin 2 having no anionic group, and a weight average molecular weight of 10,000 was obtained. Into 20.0 parts of a resin 2, 80.0 parts of pure water was added and dissolved at 80° C. to obtain an aqueous solution of a resin 2 in which a content of a resin (solid content) is 20.0%.

In a similar manner as in the above-described pigment dispersion liquid 1 except that the aqueous solution of a resin 1 was changed to an aqueous solution of a resin 2, a pigment dispersion liquid 6 in which a content of a pigment is 15.0% and a content of a resin dispersant is 7.5% was prepared.

Preparation of Resin Particle

Resin Particle 1 to 6

Into a four-necked flask equipped with a stirrer, a reflux condenser and a nitrogen gas inlet tube, potassium persulfate and ion exchanged water each having the amounts shown in Table 1 were placed, and nitrogen gas was introduced. Further, the monomers of which the kinds and use amounts are shown in Table 1 were mixed to obtain a mixture. The monomers shown in abbreviation are as follows, respectively. BMA: n-butyl methacrylate, MAA: methacrylic acid, EGdMA: ethylene glycol dimethacrylate and Aqualon KH-05 (trade name, manufactured by Dai-ichi Kogyo Seiyaku Co., Ltd.): a reactive surfactant. The obtained mixture was added dropwise into a four-necked flask over 1 hour under stirring, and then the resultant mixture was reacted at a temperature of 80° C. for 2 hours. After that, the content was cooled to room temperature, and potassium hydroxide and an adequate amount of ion exchanged water were added to adjust the pH of the liquid to 8.5. In this way, an aqueous dispersion in which a content of the resin particle is 15.0% was obtained. Table 1 also showed the characteristics of resin particle.

The surface charge amount of the resin particle was measured and calculated as follows. Hydrochloric acid was added to an aqueous dispersion of the resin particle until the pH becomes 2 or less, and the resultant mixture was stirred for 24 hours. After that, the precipitate was separated by centrifugation, and dried to obtain a resin. One g of the obtained resin was pulverized, 30 g of a 0.1 mol/L aqueous sodium hydrogen carbonate solution was added to the pulverized resin, and the resultant mixture was stirred for 15 hours. After that, the stirred mixture was subjected to centrifugation, and the supernatant was collected. Pure water was added to 1 g of the collected supernatant to prepare a 15 g of sample. The obtained sample was titrated with 0.1 mol/L hydrochloric acid by using a potential-difference automatic titrator (trade name "AT 510" manufactured by Kyoto Electronics Manufacturing Co., Ltd.), and the surface charge amount per unit mass of the resin particle was calculated from the measurement value.

The particle diameter of a resin particle was measured for the sample obtained by diluting the above-prepared aqueous dispersion of the resin particle with an adequate amount of ion exchanged water to adjust the content of the resin (solid content) to 0.1%, by using a dynamic light scattering-type particle size analyzer (for example, trade name "UPA-EX150" manufactured by NIKKISO CO., LTD.). As to the conditions at this time, under the conditions of Set Zero: 30s, the number of times of measurement: three times, measurement time: 180 seconds and refractive index: 1.5, the cumulative 50% particle diameter $D_{50}$ of the resin particle was measured on a volume basis.

TABLE 1

Synthesis conditions and characteristics of resin particle

| | | | | | | | Characteristics | | |
|---|---|---|---|---|---|---|---|---|---|
| Resin particle (parts) | Potassium persulfate (parts) | Ion exchanged water (parts) | \multicolumn{4}{c}{Use amount of monomer (parts)} | Surface charge amount (µmol/g) | Cross-link | Particle diameter (nm) |
| | | | BMA | MAA | EGdMA | Aqualon KH-05 | | | |
| 1 | 0.20 | 79.40 | 16.70 | 0.40 | 3.00 | 0.30 | 108 | Yes | 85 |
| 2 | 0.20 | 81.80 | 14.70 | | 3.00 | 0.30 | 16 | Yes | 70 |
| 3 | 0.20 | 79.59 | 16.70 | 0.21 | 3.00 | 0.30 | 70 | Yes | 80 |
| 4 | 0.15 | 81.56 | 14.30 | 0.69 | 3.00 | 0.30 | 160 | Yes | 80 |
| 5 | 0.15 | 81.53 | 14.30 | 0.72 | 3.00 | 0.30 | 165 | Yes | 85 |
| 6 | 0.20 | 79.40 | 19.70 | 0.40 | | 0.30 | 108 | No | 85 |

Preparation of Ink

Each of the components (unit: %) shown in the upper part of Tables 2 and 3 was mixed and thoroughly stirred, and then the resultant mixture was subjected to pressure filtration with a cellulose acetate filter having a pore size of 3.0 µm (manufactured by ADVANTEC Co., LTD.), and each of the inks was prepared. As the aqueous solution of a resin 1, one that had been used in the preparation of a pigment dispersion liquid 1 was used. The use amount of the ion exchanged water is a value including the amount of calcium chloride to obtain the content of the calcium ion shown in the lower part of Tables 2 and 3. The numerical value attached to polyethylene glycol is a number average molecular weight. "ACETYLENOL E100" is a trade name of a surfactant manufactured by Kawaken Fine Chemicals Co., Ltd. In the lower part of Tables 2 and 3, a content (ppm) of a calcium ion, a content P (%) of a pigment, a content E (%) of resin particle, a content S of a first water-soluble organic solvent having a relative dielectric constant (%) of 40.0 or less, a value (times) of E/P and a value (times) of S/P were shown. The content of the calcium ion in an ink was measured by using an ICP emission spectrophotometer (trade name "SPS 5100" manufactured by SII Nano Technology Inc.).

TABLE 2

| | Composition and characteristics of ink | | | | | | | | | | | | | | | | | | |
|---|---|---|---|---|---|---|---|---|---|---|---|---|---|---|---|---|---|---|---|
| | Ink | | | | | | | | | | | | | | | | | | |
| | 1 | 2 | 3 | 4 | 5 | 6 | 7 | 8 | 9 | 10 | 11 | 12 | 13 | 14 | 15 | 16 | 17 | 18 | 19 |
| Pigment dispersion liquid 1 | 33.30 | | | | | | | | | | | | | | | | | | |
| Pigment dispersion liquid 2 | | 33.30 | | | | | | | | | | | | | | | | | |
| Pigment dispersion liquid 3 | | | 33.30 | | | | | | | | | | | | | | | | |
| Pigment dispersion liquid 4 | | | | 33.30 | | | | | | | | | | | | | | | |
| Pigment dispersion liquid 5 | | | | | 33.30 | | | | | | | | | | | | | | |
| Pigment dispersion liquid 6 | | | | | | 33.30 | 33.30 | 33.30 | 33.30 | 33.30 | 33.30 | 33.30 | 33.30 | 33.30 | 33.30 | 33.30 | 33.30 | 33.30 | 33.30 |
| Aqueous dispersion of resin particle 1 | 33.30 | 33.30 | 33.30 | 33.30 | 33.30 | 33.30 | 33.30 | 33.30 | 33.30 | 33.30 | 33.30 | 33.30 | 33.30 | 33.30 | 33.30 | 33.30 | 2.70 | 3.30 | 3.30 |
| Aqueous dispersion of resin particle 2 | | | | | | | | | | | | | | | | | | | |
| Aqueous dispersion of resin particle 3 | | | | | | | | | | | | | | | | | | | |
| Aqueous dispersion of resin particle 4 | | | | | | | | | | | | | | | | | | | |
| Aqueous dispersion of resin particle 5 | | | | | | | | | | | | | | | | | | | |
| Aqueous dispersion of resin particle 6 | | | | | | | | | | | | | | | | | | 3.30 | |
| Aqueous solution of resin 1 | | | | | | | | | | | | | | | | | | | 66.70 |

TABLE 2-continued

Composition and characteristics of ink

| Ink | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|
| Glycerin (42.3) | 20.00 | 20.00 | 20.00 | 20.00 | 20.00 | 20.00 | 20.00 | 20.00 | 20.00 | 20.00 | 20.00 | 20.00 | 20.00 | 20.00 | 20.00 | 20.00 | 20.00 | 20.00 | 20.00 |
| Ethylene glycol (40.4) | | | | | | | | | | | | | | | | | | | |
| Trimethylol propane (33.7) | | | | | | 5.00 | | | | | | | | | | | | | |
| 2-Pyrrolidone (28.0) | | | | | | | 5.00 | | | | | | | | | | | | |
| 1,5-Pentanediol (27.0) | | | | | | | | 5.00 | | | | | | | | | | | |
| Triethylene glycol (22.7) | | | | | | | | | 5.00 | | | | 2.50 | | 2.50 | | | | |
| Isopropanol (18.3) | 5.00 | | | | | | | | | 5.00 | | | | | | | | | |
| 1,2-Hexanediol (14.8) | | 5.00 | 5.00 | 5.00 | 5.00 | | | | | | | | 2.50 | 2.50 | 2.50 | 2.50 | 5.00 | 5.00 | 5.00 |
| Triethylene glycol monobutyl ether (9.8) | | | | | | | | | | | 5.00 | | | | | | | | |
| Polyethylene glycol 1000 (4.6) | | | | | | | | | | | | 5.00 | | | | 2.50 | | | |
| Acetylenol E100 | 1.00 | 1.00 | 1.00 | 1.00 | 1.00 | 1.00 | 1.00 | 1.00 | 1.00 | 1.00 | 1.00 | 1.00 | 1.00 | 1.00 | 1.00 | 1.00 | 1.00 | 1.00 | 1.00 |
| Ion exchanged water | 7.40 | 7.40 | 7.40 | 7.40 | 7.40 | 7.40 | 7.40 | 7.40 | 7.40 | 7.40 | 7.40 | 7.40 | 7.40 | 7.40 | 7.40 | 7.40 | 38.00 | 37.40 | 4.00 |
| Content (ppm) of calcium ion | 20 | 20 | 20 | 20 | 20 | 20 | 20 | 20 | 20 | 20 | 20 | 20 | 20 | 20 | 20 | 20 | 20 | 20 | 20 |
| Content P (%) of pigment | 5.00 | 5.00 | 5.00 | 5.00 | 5.00 | 5.00 | 5.00 | 5.00 | 5.00 | 5.00 | 5.00 | 5.00 | 5.00 | 5.00 | 5.00 | 5.00 | 5.00 | 5.00 | 0.50 |
| Content E (%) of resin particle | 5.00 | 5.00 | 5.00 | 5.00 | 5.00 | 5.00 | 5.00 | 5.00 | 5.00 | 5.00 | 5.00 | 5.00 | 5.00 | 5.00 | 5.00 | 5.00 | 0.41 | 0.50 | 10.01 |
| Content S (%) of first solvent | 5.00 | 5.00 | 5.00 | 5.00 | 5.00 | 5.00 | 5.00 | 5.00 | 5.00 | 5.00 | 5.00 | 5.00 | 5.00 | 5.00 | 5.00 | 5.00 | 5.00 | 5.00 | 5.00 |
| Value (times) of E/P | 1.00 | 1.00 | 1.00 | 1.00 | 1.00 | 1.00 | 1.00 | 1.00 | 1.00 | 1.00 | 1.00 | 1.00 | 1.00 | 1.00 | 1.00 | 1.00 | 0.08 | 0.10 | 20.02 |
| Value (times) of S/P | 1.00 | 1.00 | 1.00 | 1.00 | 1.00 | 1.00 | 1.00 | 1.00 | 1.00 | 1.00 | 1.00 | 1.00 | 1.00 | 1.00 | 1.00 | 1.00 | 1.00 | 1.00 | 10.00 |

TABLE 3

| | Composition and characteristics of ink | | | | | | | | | | | | | | | | | |
|---|---|---|---|---|---|---|---|---|---|---|---|---|---|---|---|---|---|---|
| | Ink | | | | | | | | | | | | | | | | | |
| | 20 | 21 | 22 | 23 | 24 | 25 | 26 | 27 | 28 | 29 | 30 | 31 | 32 | 33 | 34 | 35 | 36 | 37 |
| Pigment dispersion liquid 1 | 33.30 | 33.30 | 33.30 | 3.30 | 33.30 | 33.30 | 33.30 | 33.30 | 33.30 | 33.30 | 33.30 | 33.30 | | 33.30 | 33.30 | 33.30 | 33.30 | 33.30 |
| Pigment dispersion liquid 2 | | | | | | | | | | | | | | | | | | |
| Pigment dispersion liquid 3 | | | | | | | | | | | | | | | | | | |
| Pigment dispersion liquid 4 | | | | | | | | | | | | | | | | | | |
| Pigment dispersion liquid 5 | | | | | | | | | | | | | | | | | | |
| Pigment dispersion liquid 6 | | | | | | | | | | | | | | | | | | |
| Aqueous dispersion of resin particle 1 | 33.30 | | | | | | | | | | | | 33.30 | | | | | |
| Aqueous dispersion of resin particle 2 | | | | 33.30 | 33.30 | | | | | | | | | | | | | |
| Aqueous dispersion of resin particle 3 | | | 33.30 | 33.30 | | | | | | | | | | | | | | |
| Aqueous dispersion of resin particle 4 | | | | | | 33.30 | | | | | | | | | | | | |
| Aqueous dispersion of resin particle 5 | | | | | | | 33.30 | | | | | | | | | | | |
| Aqueous dispersion of resin particle 6 | | | | | | | | | 33.30 | | | | | | | | | |
| Aqueous solution of resin 1 | | | | | | | | | | 33.30 | 33.30 | 33.30 | | | | | | |
| Glycerin (42.3) | 24.60 | 24.50 | 15.00 | 15.00 | | | | | | | | | | 25.00 | | | | |
| Ethylene glycol (40.4) | | | | | 20.00 | 20.00 | 20.00 | 20.00 | 20.00 | 20.00 | 20.00 | 20.00 | 20.00 | 20.00 | 20.00 | 25.00 | 20.00 | 25.00 |
| Trimethylol propane (33.7) | | | | | | | | | | | | | | | | | 5.00 | |
| 2-Pyrrolidone (28.0) | | | | | | | | | | | | | | | | | | |
| 1,5-Pentanediol (27.0) | | | | | | | | | | | | | | | | | | |
| Triethylene glycol (22.7) | | | | | | | | | | | | | | | | | | |
| Isopropanol (18.3) | | | | | | | | | | | | | | | | | | |
| 1,2-Hexanediol (14.8) | 0.40 | 0.50 | 10.00 | 10.00 | 5.00 | 5.00 | 5.00 | 5.00 | 5.00 | 5.00 | 5.00 | 5.00 | 5.00 | 5.00 | 5.00 | | | |
| Triethylene glycol monobutyl ether (9.8) | | | | | | | | | | | | | | | | | | |
| Polyethylene glycol 1000 (4.6) | | | | | | | | | | | | | | | | | | |
| Acetylenol E100 | 1.00 | 1.00 | 1.00 | 1.00 | 1.00 | 1.00 | 1.00 | 1.00 | 1.00 | 1.00 | 1.00 | 1.00 | 1.00 | 1.00 | 1.00 | 1.00 | 1.00 | 1.00 |
| Ion exchanged water | 7.40 | 7.40 | 7.40 | 37.40 | 7.40 | 7.40 | 7.40 | 7.40 | 7.40 | 7.40 | 7.40 | 7.40 | 40.70 | 15.70 | 40.70 | 7.40 | 7.40 | 40.70 |
| Content (ppm) of calcium ion | 20 | 20 | 20 | 20 | 20 | 20 | 20 | 20 | 20 | 120 | 125 | 20 | 20 | 20 | 20 | 20 | 20 | 20 |
| Content P (%) of pigment | 5.00 | 5.00 | 5.00 | 0.50 | 5.00 | 5.00 | 5.00 | 5.00 | 5.00 | 5.00 | 5.00 | 5.00 | 5.00 | 5.00 | 5.00 | 5.00 | 5.00 | 5.00 |
| Content E (%) of resin particle | 5.00 | 5.00 | 5.00 | 5.00 | 5.00 | 5.00 | 5.00 | 5.00 | 5.00 | 5.00 | 5.00 | 5.00 | 5.00 | 5.00 | 5.00 | 5.00 | 5.00 | 0.00 |
| Content S (%) of first solvent | 0.40 | 0.50 | 10.00 | 10.00 | 5.00 | 5.00 | 5.00 | 5.00 | 5.00 | 5.00 | 5.00 | 5.00 | 5.00 | 5.00 | 5.00 | 5.00 | 5.00 | 0.00 |
| Value (times) of E/P | 1.00 | 1.00 | 1.00 | 10.00 | 1.00 | 1.00 | 1.00 | 1.00 | 1.00 | 1.00 | 1.00 | 1.00 | 1.00 | 1.00 | 1.00 | 1.00 | 1.00 | 0.00 |
| Value (times) of S/P | 0.08 | 0.10 | 2.00 | 20.00 | 1.00 | 1.00 | 1.00 | 1.00 | 1.00 | 1.00 | 1.00 | 1.00 | 1.00 | 1.00 | 1.00 | 0.00 | 0.00 | 0.00 |

Evaluation

Each of the inks was filled in an ink storage portion (main tank and sub tank) of an ink jet recording apparatus having the main part shown in FIG. 1, and the following evaluations were performed. As the recording head, a line-type recording head in which recording element substrates having 1024 nozzles, a nozzle density per nozzle row of 600 dpi and an ink ejection amount per nozzle of 5 ng had been staggeringly arranged was used. Further, the ink was heated so that the temperature of the ink in the recording head is 40° C., and the following items were evaluated. In the present invention, the expression of "A" and "B" were set as acceptable levels, and the expression of "C" and "D" were set as unacceptable levels in accordance with the evaluation criteria of the following items. The evaluation conditions, and the evaluation results are shown in Table 4.

The conditions of circulation and degassing when the following items are evaluated were as follows.

(1) With circulation+with degassing: a degassing operation was performed to depressurize the inside of the sub tank to −60 kPa for 30 minutes by using a degassing pump once every 5 hours while circulating an ink in an ink circulation system at a speed (flow rate) of 5 mL/min by using a circulation pump. The ink was continuously circulated also during image recording.

(2) Without circulation+with degassing: a degassing operation was performed to depressurize the inside of the sub tank to −60 kPa for 30 minutes by using a degassing pump once every 5 hours in a similar manner as in the above (1) except that the ink was not circulated.

(3) With circulation+without degassing: the ink in an ink circulation system was circulated at a speed (flow rate) of 5 mL/min by using a circulation pump in a similar manner as in the above (1) except that the degassing was not performed. The ink was continuously circulated also during image recording.

Degassing Efficiency

The following degassing efficiency was evaluated in an environment of a temperature of 25° C. and a relative humidity of 50%. The circulation and degassing of (1) to (3) were performed in a state that the recording head was capped. Any of the steps (1) to (3) was performed by using the above-described ink jet recording apparatus. Next, a recording medium was conveyed at a speed of 15 inches/sec, and 10 solid images were recorded on the entire surface of an A4-size recording medium under the condition that three droplets of ink are applied to a unit area of 1/600 inch×1/600 inch. As the recording medium, plain paper (trade name "high-quality exclusive paper HR-101S" manufactured by Canon Inc.) was used.

The cycle of any of the above steps (1) to (3) and recording of an image was repeated 200 times (circulation of around 1,000 hours). After that, further, 10 solid images similar to those in the above were recorded, and the tenth solid image was visually inspected. In a case where the solid image is disturbed, the recording head was observed with an optical microscope, the number of the ejection orifices from which non-ejection due to air bubbles had been generated was counted, and the degassing efficiency was evaluated in accordance with the following evaluation criteria.

A: There was no disturbance in the solid image, and non-ejection due to air bubbles was not generated.

B: The number of ejection orifices from which non-ejection due to air bubbles had been generated was 1 to 9.

C: The number of ejection orifices from which non-ejection due to air bubbles had been generated was 10 to 99.

D: The number of ejection orifices from which non-ejection due to air bubbles had been generated was 100 or more.

In addition, after repeating the above cycle 200 times, the amount of dissolved air in each of the inks of Examples 1 to 30 and Comparative Examples 1 to 7 was evaluated. As a result, the amount of dissolved air (measured as the amount of dissolved oxygen) in the inks of Examples 1 to 30 was lower than 5.0 mg/L even at the highest. In contrast, the amount of dissolved air (measured as the amount of dissolved oxygen) in the inks of Comparative Example 1 to 7 was higher than 6.5 mg/L even at the lowest.

Ejection Recoverability

The following ejection recoverability was evaluated in an environment of a temperature of 30° C. and a relative humidity of 10%. The circulation and degassing of (1) to (3) were performed in a state that the recording head was not capped. Any of the steps (1) to (3) was repeated 70 times (around 350 hours of circulation) by using the above-described ink jet recording apparatus. After that, the ink jet recording apparatus was placed in an environment of a temperature 25° C. and a relative humidity of 50% for 6 hours, returned to ordinary temperature, and then the suction recovery operation was performed twice in order to discharge the ink in the ink circulation system. Next, under the condition that three droplets of ink are applied to a unit area of 1/600 inch×1/600 inch, a recording medium was conveyed at a speed of 15 inches/sec, and one solid image was recorded on the entire surface of an A4-size recording medium. As the recording medium, plain paper (trade name "high-quality exclusive paper HR-101S" manufactured by Canon Inc.) was used. The obtained solid image was visually inspected, and the ejection recoverability was evaluated in accordance with the following evaluation criteria.

A: There was no non-ejection

C: There was non-ejection in at least some of the ejection orifices

TABLE 4

Evaluation conditions and evaluation results

| | | Evaluation conditions | | | Evaluation results | |
|---|---|---|---|---|---|---|
| | | Circulation | Degassing | Ink | Degassing efficiency | Ejection recoverability |
| Example | 1 | Yes | Yes | 1 | A | A |
| | 2 | Yes | Yes | 2 | A | A |
| | 3 | Yes | Yes | 3 | A | A |
| | 4 | Yes | Yes | 4 | A | A |
| | 5 | Yes | Yes | 5 | A | A |
| | 6 | Yes | Yes | 6 | B | A |
| | 7 | Yes | Yes | 7 | B | A |
| | 8 | Yes | Yes | 8 | A | A |
| | 9 | Yes | Yes | 9 | A | A |
| | 10 | Yes | Yes | 10 | B | A |
| | 11 | Yes | Yes | 11 | A | A |
| | 12 | Yes | Yes | 12 | A | A |
| | 13 | Yes | Yes | 13 | A | A |
| | 14 | Yes | Yes | 14 | A | A |
| | 15 | Yes | Yes | 15 | A | A |
| | 16 | Yes | Yes | 16 | A | A |
| | 17 | Yes | Yes | 17 | B | A |
| | 18 | Yes | Yes | 18 | A | A |
| | 19 | Yes | Yes | 19 | A | A |
| | 20 | Yes | Yes | 20 | B | A |

TABLE 4-continued

Evaluation conditions and evaluation results

| | | Evaluation conditions | | | Evaluation results | |
|---|---|---|---|---|---|---|
| | | Circulation | Degassing | Ink | Degassing efficiency | Ejection recoverability |
| | 21 | Yes | Yes | 21 | A | A |
| | 22 | Yes | Yes | 22 | A | A |
| | 23 | Yes | Yes | 23 | A | A |
| | 24 | Yes | Yes | 24 | A | A |
| | 25 | Yes | Yes | 25 | A | A |
| | 26 | Yes | Yes | 26 | A | A |
| | 27 | Yes | Yes | 27 | B | A |
| | 28 | Yes | Yes | 28 | B | A |
| | 29 | Yes | Yes | 29 | A | A |
| | 30 | Yes | Yes | 30 | B | A |
| Comparative Example | 1 | Yes | Yes | 31 | C | A |
| | 2 | Yes | Yes | 32 | C | A |
| | 3 | Yes | Yes | 33 | C | A |
| | 4 | Yes | Yes | 34 | C | A |
| | 5 | Yes | Yes | 35 | C | A |
| | 6 | Yes | Yes | 36 | C | A |
| | 7 | Yes | Yes | 37 | C | A |
| Reference Example | 1 | Yes | No | 1 | D | A |
| | 2 | Yes | No | 37 | D | A |
| | 3 | No | Yes | 1 | A | C |
| | 4 | No | Yes | 37 | A | C |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-138191, filed Jul. 14, 2017, and Japanese Patent Application No. 2018-118101, filed Jun. 21, 2018, which are hereby incorporated by reference herein in their entirety.

What is claimed is:

1. An ink jet recording method of recording an image on a recording medium by ejecting an ink from a recording head by using an ink jet recording apparatus equipped with (i) an ink storage portion for storing the ink, (ii) the recording head for ejecting the ink, (iii) a unit for circulating the ink in an ink circulation system arranged between the ink storage portion and the recording head, and (iv) a unit for degassing the ink circulating in the ink circulation system,
wherein the ink is an aqueous ink containing a pigment dispersed by an action of an anionic group, a resin particle, and a water-soluble organic solvent,
wherein the water-soluble organic solvent comprises a first water-soluble organic solvent having a relative dielectric constant of 34.0 or less, and
wherein the resin particle is a cross-linked resin particle that does not include any coloring materials.

2. The ink jet recording method according to claim 1, wherein a content (% by mass) of the resin particle in the ink is 0.10 times or more in terms of mass ratio relative to a content (% by mass) of the pigment.

3. The ink jet recording method according to claim 1, wherein a content (% by mass) of the first water-soluble organic solvent (% by mass) in the ink is 0.10 times or more in terms of mass ratio relative to a content (% by mass) of the pigment.

4. The ink jet recording method according to claim 1, wherein the first water-soluble organic solvent comprises a water-soluble organic solvent having a relative dielectric constant of 27.0 or less.

5. The ink jet recording method according to claim 1, wherein a surface charge amount (μmol/g) of the resin particle is 160 μmol/g or less.

6. The ink jet recording method according to claim 1, wherein a content (ppm) of a calcium ion in the ink is 120 ppm or less.

7. The ink jet recording method according to claim 1, wherein the recording head is a line-type recording head.

8. An ink jet recording apparatus comprising:
(a) an ink storage portion for storing an ink;
(b) a recording head for ejecting the ink;
(c) a unit for circulating the ink in an ink circulation system arranged between the ink storage portion and the recording head; and
(d) a unit for degassing the ink circulating in the ink circulation system,
wherein the ink is an aqueous ink containing a pigment dispersed by an action of an anionic group, a resin particle, and a water-soluble organic solvent,
wherein the water-soluble organic solvent comprises a first water-soluble organic solvent having a relative dielectric constant of 34.0 or less, and
wherein the resin particle is a cross-linked resin particle that does not include any coloring materials.

9. The ink jet recording method according to claim 1, wherein the pigment dispersed by an action of an anionic group comprises a pigment that is dispersed by a water-soluble resin that has the anionic group.

10. The ink jet recording method according to claim 1, wherein the pigment dispersed by an action of an anionic group comprises a pigment that has the anionic group bonded to a particle surface of the pigment directly or through another atomic group.

11. The ink jet recording method according to claim 1, wherein a content (% by mass) of the pigment in the ink is 0.5% by mass or more to 15.0% by mass or less with respect to the total mass of the ink.

12. The ink jet recording method according to claim 1, wherein a content (% by mass) of the resin particle in the ink is 0.10% by mass or more to 20.00% by mass or less with respect to the total mass of the ink.

13. The ink jet recording method according to claim 1, wherein a content (% by mass) of the first water-soluble organic solvent in the ink is 0.10% by mass or more to 20.00% by mass or less with respect to the total mass of the ink.

14. The ink jet recording method according to claim 1, wherein a flow speed of ink circulation in the ink circulation system is set to be 1 to 50 mL/min.

15. The ink jet recording method according to claim 1, wherein a flow speed of ink circulation in the ink circulation system is set to be 1 to 10 mL/min.

16. The ink jet recording method according to claim 1, wherein the unit for degassing comprises a depressurizing unit of the ink storage portion.

17. The ink jet recording method according to claim 1, wherein the unit for degassing comprises a hollow fiber degassing unit.

* * * * *